United States Patent [19]

Paris

[11] 3,969,457
[45] July 13, 1976

[54] CARBON BLACK PELLETING
[75] Inventor: Bobby J. Paris, Toledo, Ohio
[73] Assignee: Phillips Petroleum Company, Bartlesville, Okla.
[22] Filed: Dec. 2, 1971
[21] Appl. No.: 204,019

[52] U.S. Cl. .............................................. 264/117
[51] Int. Cl.² ........................................... B01J 2/12
[58] Field of Search .................................. 264/117

[56] References Cited
UNITED STATES PATENTS 2,794,749  6/1957  Schulze .............................. 106/307
3,277,218  10/1966  Dollinger ........................... 264/117
3,634,310  1/1972  Frazier .............................. 264/117

OTHER PUBLICATIONS

Agglomeration, Chemical Engineering, Dec. 4, 1967, McGraw–Hill Pub. Co., N.Y., pp. 154, 155.

Primary Examiner—Robert F. White
Assistant Examiner—J. R. Hall

[57] ABSTRACT

A method of pelleting carbon black in which an aqueous solution comprising lignosulfonate and nitric acid is employed, the use of the solution producing a preferred particle size distribution of the pellets formed.

3 Claims, 1 Drawing Figure

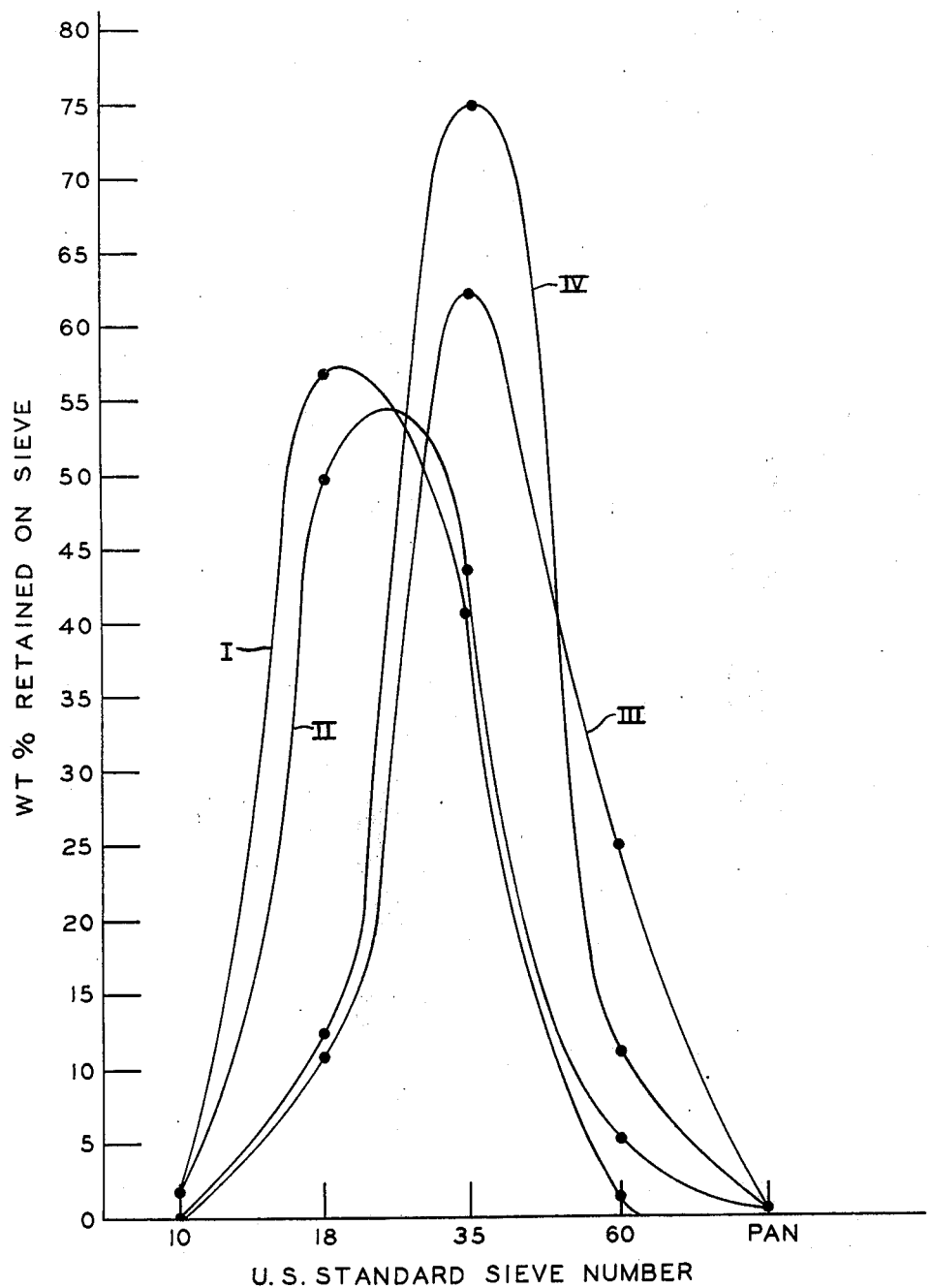
CURVES I, II AND III
ARE PRIOR ART.

CARBON BLACK PELLETING

This invention relates to the pelleting of carbon black.

In one of its more specific aspects, this invention relates to the employment of a pelleting agent which advantageously affects the particle size distribution of the pellets formed.

Various pelleting agents are employed in pelleting carbon black. Some of these agents are molasses, nitric acid, lignosulfonate and the like, all of which are employed generally as aqueous solutions. As such, they are introduced into a pelleter with the carbon black and the carbon black is pelleted. The moist pellet so produced is transferred from the pelleter to a dryer where the moisture is substantially removed from the pellet.

It has determined that the particle size distribution of the pellets is attributable to the nature of the pelleting agent used, not only as to the size of the particles produced but also as to the percentages of the various sizes produced. The present invention provides a pelleting agent, the use of which produces a more desirable particle size distribution of pellet sizes.

According to the present invention there is provided a method of pelleting carbon black which employs an aqueous solution of lignosulfonate and nitric acid. These materials are employed in the form of an aqueous solution comprising from about 1 to about 2 weight percent lignosulfonate and from about 4.5 to about 6.5 weight percent $HNO_3$. In the preferred embodiment, the pelleting solution comprises an aqueous solution comprising about 1 weight percent lignosulfonate and about 5.5 weight percent $HNO_3$. The beneficial effects of the use of this pelleting agent manifest themselves in preferred particle size distribution and, as compared to molasses which is a widely used pelleting agent, with lower electrical power requirements for pelleting.

While the invention will be discussed herein in terms of "lignosulfonate," and the data will pertain to the use of ammonium lignosulfonate, it is to be understood that the invention also includes the use of alkali metal and alkaline earth metal lignosulfonate salts.

The present invention is applicable to the pelleting of carbon black using those methods and agents conventionally employed to pellet carbon black as set forth in the prior art. Relatedly, the pelleted black formed is dried by conventional drying procedures of the prior art.

The method of this invention produces improved results as indicated on the attached FIGURE which will be referred to hereinafter.

The best method of practicing the method of this invention is illustrated by the following procedure and the data presented in conjunction therewith.

The following data present the results of employing various pelleting agents under substantially identical conditions and determining the particle size distribution of the pellets.

The four pelleting agents were employed in the form of an aqueous solution of the concentration indicated. In each instance, carbon black, produced under substantially identical conditions in respect to those conditions which would alter its characteristics, was pelleted under substantially identical conditions. Substantially identical drying conditions were employed.

Four aqueous pelleting solutions were individually employed, one solution being that of the present invention in its preferred embodiment. Data and results were as follows:

| Pelleting Agent in Solution | 1 Wt. % Molasses | 1.5 Wt. % Ammonium Lignosulfonate | 6.7 Wt. % $HNO_3$ | 1 Wt. % Ammonium Lignosulfonate & 5.5 wt. % $HNO_3$ |
|---|---|---|---|---|
| Solution Rate, gph | 19.7 | 21 | 24.6 | 23.2 |
| Pelleter Speed, rpm | 500 | 500 | 500 | 500 |
| Carbon Black Rate, No./hr. | 157.6 | 137.4 | 157.7 | 153.7 |
| Motor Load, amps | 10 | 8 | 10.5 | 9.0 |
| Dried Pellet Screen Analysis, Cum. Wt. % Sieve No. (U.S. Std.) | | | | |
| 10 | 0.3 | 1.5 | 0.1 | 0.0 |
| 18 | 57.3 | 50.5 | 10.5 | 12.1 |
| 35 | 97.6 | 93.9 | 72.0 | 87.3 |
| 60 | 99.1 | 99.1 | 97.0 | 98.2 |
| 120 | 99.4 | 99.2 | 99.2 | 99.2 |
| Pan | 99.6 | 99.4 | 100 | 100 |
| Curve No. | I | II | III | IV |

The same source of flocculent carbon black was used in all of the runs. The black had a photelometer value of about 95, a nitrogen surface area of about 100 $m^2/gm$, and a DBP absorption value of about 105 cc/100 gm. The pelleting temperature used in all runs was about 200° F. using a conventional rotary pintype wet pelleter. Drying of the pellets in all runs was carried out in a conventional rotary drier at about 400° F., until the final moisture content of the pellets was less than about 0.3 weight percent.

When these data are plotted to relate the weight percent retained on a sieve to the sieve number, those curves illustrated on the attached FIGURE result. These curves indicate that the solution which is representative of this invention produces not only a narrower distribution of particle size pellets but also produces a large number of pellets of comparable size. This distribution is much preferred to that produced by the other agents employed and is quite unexpected in view of those distributions produced by employment of lignosulfonate and $HNO_3$, individually. Summarily, these data indicate that in employing the method of this invention, the amount of pellets retained on Sieve No. 35 was 75.2 weight percent whereas the amount retained was 43.4 and 61.5, respectively, when employing lignosulfonate and nitric acid individually. Only 40.3 weight percent was retained when employing molasses.

It will be evident from the foregoing that various modifications can be made to the method of this invention. Such, however, are considered to be within the scope of the invention.

What is claimed is:

1. A method of pelleting carbon black which comprises introducing carbon black and an aqueous solution comprising from about 1 to about 2 weight percent lignosulfonate and from about 4.5 to about 6.5 weight percent $HNO_3$ into a pelleter, and pelleting said carbon black in contact with said solution.

2. The method of claim 1 in which said solution comprises about 1 weight percent lignosulfonate and about 5.5 weight percent nitric acid.

3. The method of claim 1 in which said pellets are dried.

* * * * *